United States Patent [19]

Dammann

[11] Patent Number: 4,606,355
[45] Date of Patent: Aug. 19, 1986

[54] HARVESTER THRESHER
[75] Inventor: Johannes Dammann, Harsewinkel, Fed. Rep. of Germany
[73] Assignee: Claas OHG, Harsewinkel, Fed. Rep. of Germany
[21] Appl. No.: 702,874
[22] Filed: Feb. 19, 1985
[30] Foreign Application Priority Data Mar. 17, 1984 [DE] Fed. Rep. of Germany ....... 3409951

[51] Int. Cl.$^4$ ........................................... A01F 12/18
[52] U.S. Cl. ................... 130/27 T; 130/27 Q
[58] Field of Search ................. 130/27 T, 27 P, 27 Q, 130/27 R; 56/14.6

[56] References Cited
U.S. PATENT DOCUMENTS

| Re. 31,860 | 4/1965 | De Coene et al. | 130/27 P |
|---|---|---|---|
| 3,038,476 | 6/1962 | Andersen | 130/27 |
| 3,662,763 | 5/1972 | Denison et al. | 130/27 P |
| 4,117,849 | 10/1978 | Pakosh | 130/27 Q |
| 4,149,543 | 4/1979 | De Coene et al. | 130/23 |
| 4,303,078 | 12/1981 | Stokland | 130/27 T |
| 4,367,757 | 1/1983 | Claas | 130/27 T |
| 4,478,226 | 10/1984 | Tophinke | 130/27 T |
| 4,498,483 | 2/1985 | Dammann | 130/27 T |

Primary Examiner—Paul J. Hirsch
Attorney, Agent, or Firm—Michael J. Striker

[57] ABSTRACT

A harvester thresher has an axial threshing and separating arrangement with two rotatable threshing drums and two casing units surrounding the threshing drums and having an upper product supply opening and a lower supply opening, a radial threshing mechanism located upstream of the axial threshing and separating arrangement as considered in a product flow direction, and a guiding element subdivided into an upper part which is bent upwardly to supply a product threshed by the radial threshing mechanism toward the upper product supply opening of the axial threshing and separating arrangement and a lower part which is bent downwardly to supply the product threshed by the radial threshing mechanism toward the lower product supply opening of the axial threshing and separating arrangement.

6 Claims, 5 Drawing Figures

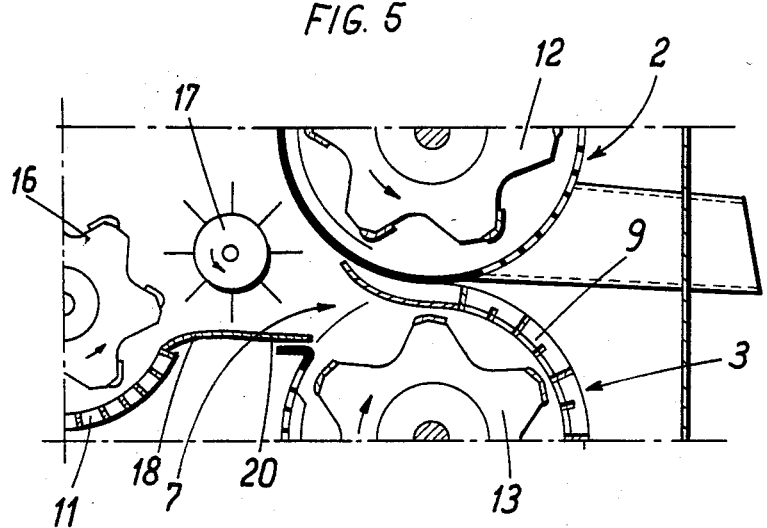
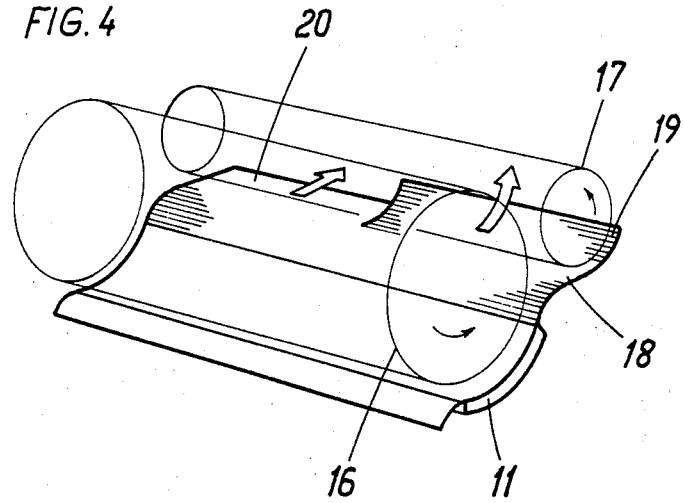

HARVESTER THRESHER

BACKGROUND OF THE INVENTION

The present invention relates to a harvester thresher. More particularly it relates to a harvester thresher which is provided with an axial threshing and separating arrangement arranged in a housing and including a rotatable drum arranged in a casing unit with a small gap therebetween wherein the casing unit is subdivided into a thresh basket and a sieve. The thresh basket-sieve casing unit has a product supply opening in its thresh basket part, and a product discharge opening at its other end.

Harvester threshers of the above-mentioned general type are known in the art. One of such harvester threshers is disclosed, for example, in the U.S. patent application Ser. No. 572,925 now U.S. Pat. No. 4,498,483. In this harvester thresher an active cooperation between the threshing drums and the thresh basket-sieve casing units relative to one another is provided. In the harvester thresher of this construction, distance between both parallel axes of rotation substantially correspond to the outer diameter of one thresh basket-sieve casing unit, and the thresh basket-sieve casing units overlap with their ends in a product supply region by substantially the double width of each product supply opening. The threshing drums and thresh basket-sieve casing units designed in accordance with these features are formed as a small structural unit which can be arranged at any point of the harvester thresher, without exceeding the width allowable for straight transportation of a harvester thresher in accordance with the street traffic regulations. This harvester thresher can be further improved in the sense of guaranteeing a reliable separation of the product toward both thresh basket-sieve casing units and increase of the output of the harvester thresher.

SUMMARY OF THE INVENTION

In keeping with these objects and with others which will become apparent hereinafter, one feature of the present invention resides, briefly stated, in a harvester thresher which has an axial threshing and separating arrangement including rotatable threshing drums and associated casing units subdivided into a thresh basket and a sieve and provided with a product supply opening in its thresh basket part and a product discharge opening at its other end, wherein the harvester thresher is provided with a radial threshing mechanism having a guiding member which is subdivided into two parts one of which is bent toward an upper supply opening and the other of which is bent toward the lower supply opening.

When the harvester thresher is designed in accordance with these features, the radial threshing mechanism preceding the axial threshing and separating mechanism performs a greater part of the threshing work and therefore the axial threshing and separating mechanism is substantially unloaded. This means that for full loading of all threshing elements the output of the harvester thresher can be increased. A further advantage of this harvester thresher is that with the preceding threshing mechanism the product is comminuted and therefore the product stream can be better subdivided into two partial streams. This subdivision is performed by the above-described two-part guiding member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a view showing a guiding member associated with a product transfer drum, in perspective; and FIG. 5 is a view showing a section along the line IV—IV in FIG. 3.

DESCRIPTION OF A PREFERRED EMBODIMENT

Figure 1:
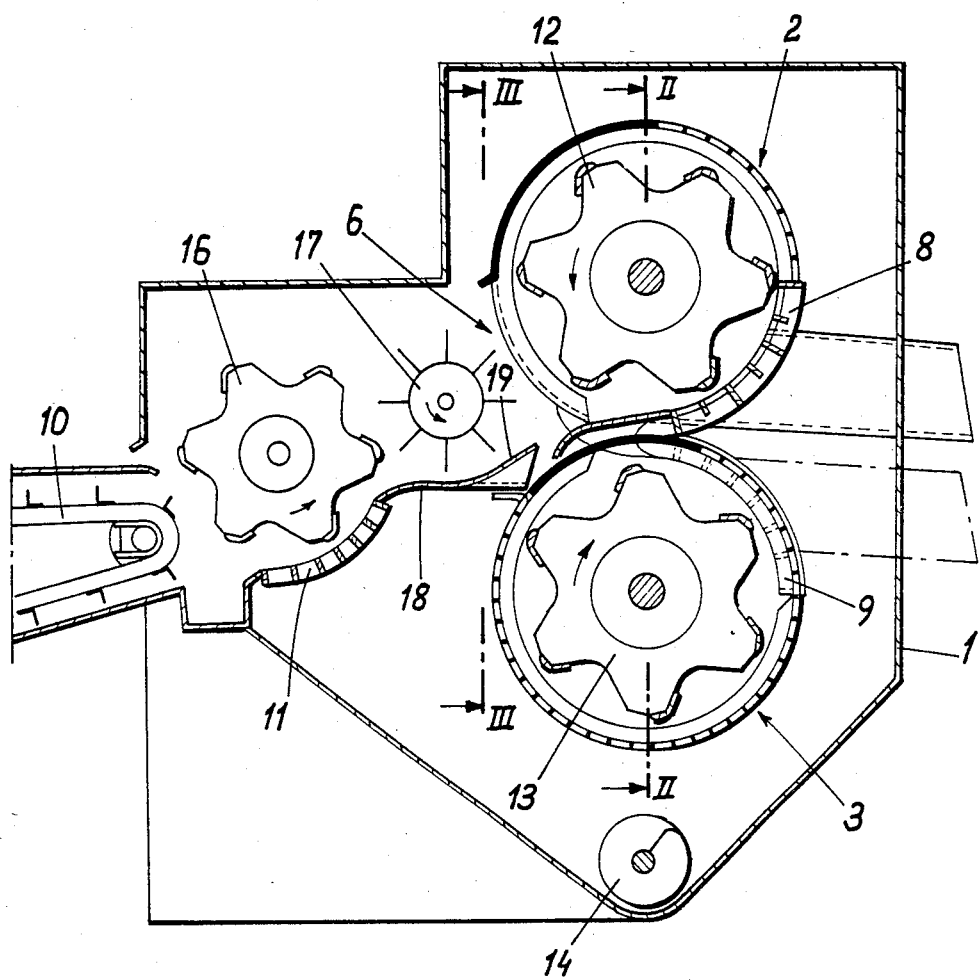
FIG. 1 is a side view of a harvester thresher in accordance with the present invention, as seen in a section taken along the line I—I in FIG. 3.

A harvester thresher in accordance with the present invention has a housing which is identified with reference numeral 1. A threshing and separating arrangement is accommodated in the housing 1. The axial threshing and separating arrangement has two threshing drums 12 and 13 which are rotatable about parallel axes.

Figure 2:
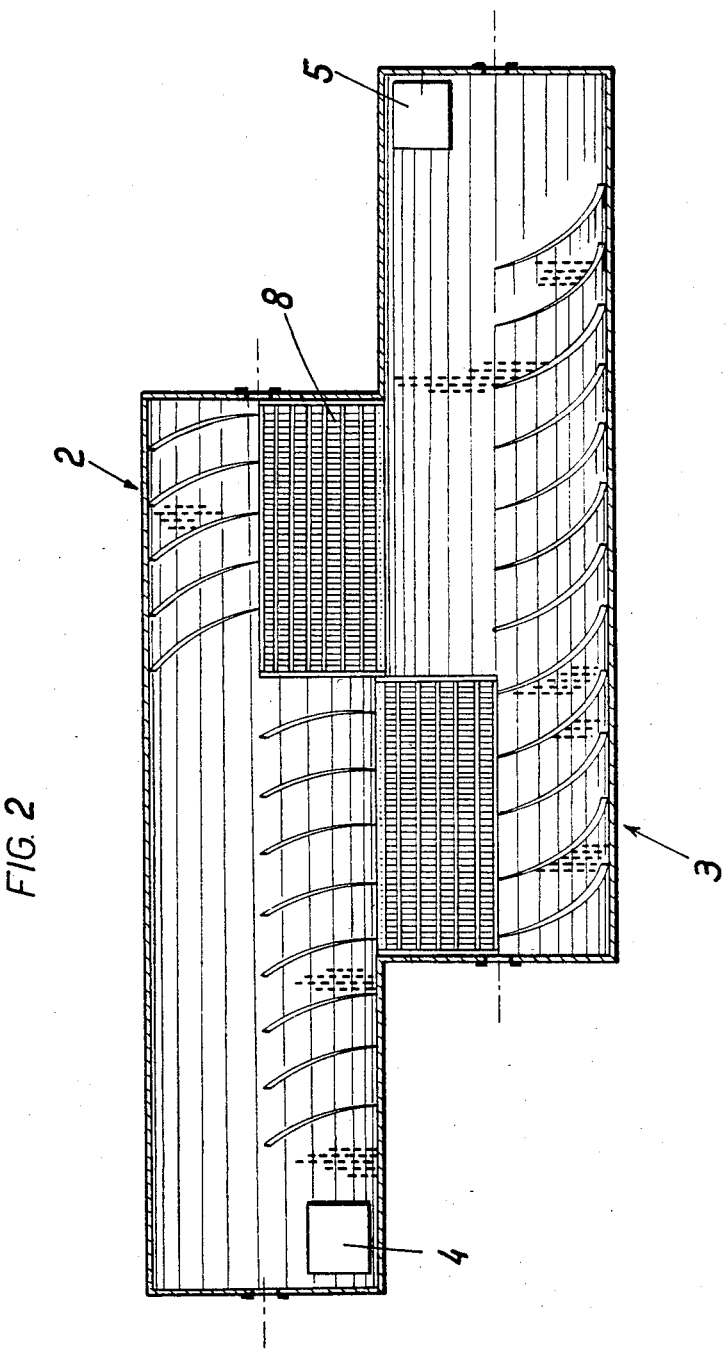
FIG. 2 is a view showing a thresh basket-sieve casing unit of the inventive harvester thresher, in a section taken along the line II—II in FIG. 1, without a threshing drum.
Figure 3:
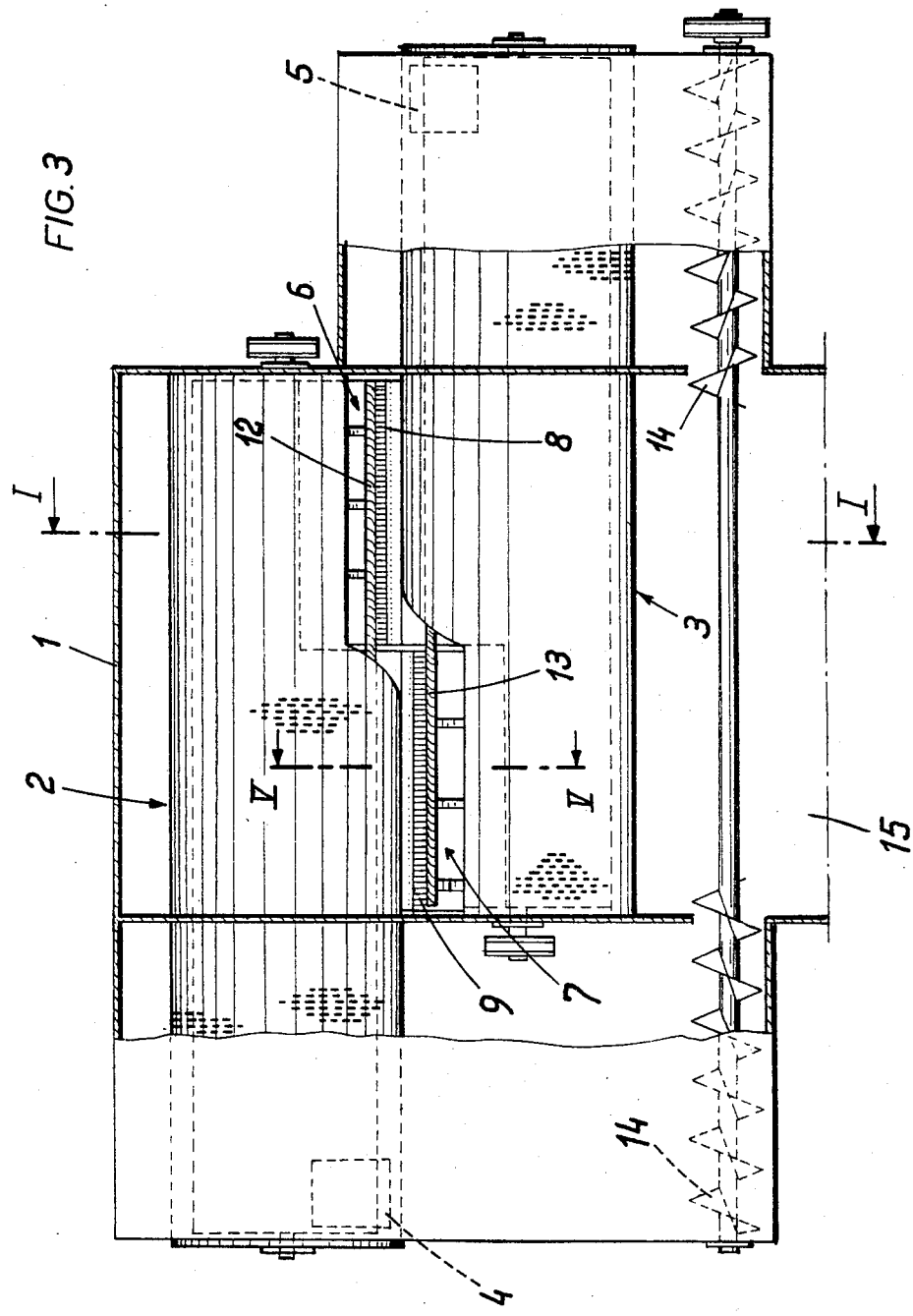
FIG. 3 is a view showing a fragment of FIG. 1 in a section taken along line III—III in FIG. 1.

The threshing drums 12 and 13 are surrounded by thresh basket-sieve casing units 2 and 3, respectively. The units 2 and 3 have product discharge openings 4 and 5 and product supply openings 6 and 7. The units 2 and 3 are formed on their periphery as thresh baskets 8 and 9, substantially over one third of their periphery in the region of the product supply openings 6 and 7 and in correspondence with the width of the latter. As can be seen from FIG. 2, the units 2 and 3 overlap one another so that the product supply openings 6 and 7 of the thresh baskets 8 and 9 are located close to one another and offset relative to one another in their height.

The harvester thresher has an inclined conveyor which is identified with reference numeral 10. A product transported by the inclined conveyor 10 is supplied to a threshing unit which operates in accordance with a radial flow principle and is located after the inclined conveyor 10 and before the axial threshing and separating arrangement. This threshing unit includes a thresh basket 11 and a threshing drum 16. The radial threshing units thresh a greater part of the product supplied by the inclined conveyor 10. Also, the product is comminuted during the threshing process.

The partially threshed and comminuted product is further transported to a product transfer drum 17 and a guiding member 18 associated therewith. The guiding member 18 is formed as a guiding sheet. The guiding sheet is subdivided into two parts at least in its end region which faces the thresh basketsieve casing units 2 and 3. These parts are identified with reference numeral 19 and 20, respectively. One part 19 of the guiding member 18 is bent toward the upper product supply opening 6, whereas the other part 20 of the guiding member 18 is bent toward the lower product supply opening 7.

The thus formed guiding member 18 in cooperation with the product transfer drum 17 subdivides the threshed and comminuted product stream into at least two partial product streams. One of these partial product streams is supplied through the opening 6 of the thresh basket-sieve casing unit 2, whereas the other partial stream is supplied through the opening 7 of the thresh basket-sieve casing unit 3. The threshing drums 12 and 13 rotatable in the units 2 and 3 of the axial threshing and separating arrangement thresh the product in a known manner. A threshed out straw is thrown through the product discharge opening 4 and 5 onto the field, whereas the grain-chaff mixture is supplied through through-going openings provided in the thresh basket-sieve casing units 2 and 3 into the lower part of the housing 1. A collecting screw 14 transports the grain-chaff mixture and supplies the same through an outlet opening 15 of the housing 1 to a wind sieve arrangement which is not shown in the drawing.

It will be understood that each of the elements described above, or two or more together, may also find a useful application in other types of constructions differing from the types described above.

While the invention has been illustrated and described as embodied in a havester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A harvester thresher, comprising a housing; an axial threshing and separating arrangement located in said housing and having two threshing drums rotatable about substantially parallel axes of rotation, and two thresh basket-sieve casing units each circumferentially surrounding a respective one of said threshing drums with retaining a small gap, each of said casing units having a product supply opening at its one end and a product discharge opening at its other end, said product supply openings being spaced from one another in substantially vertical direction and including an upper product supply opening and a lower product supply opening; a radial threshing mechanism operating in accordance with a radial flow and located upstream of said axial threshing and separating arrangement; and means for guiding a product threshed by said radial threshing mechanism toward said axial threshing and separating arrangement, said guiding means including a guiding member having two guiding parts, one of said guiding parts being bent upwardly so as to guide the product threshed by said radial threshing mechanism toward said upper product supply opening, whereas the other of said guiding parts being bent downwardly so as to guide the product threshed by said radial threshing mechanism toward said lower product supply opening.

2. A harvester thresher as defined in claim 1, wherein said guiding member of said guiding means is formed as a guiding sheet having said two parts.

3. A harvester thresher as defined in claim 1, wherein said guiding member has an end region associated with said thresh basket-sieve casing units, said parts being provided in said end region of said guiding member.

4. A harvester thresher as defined in claim 1, wherein said radial threshing mechanism includes a rotatable threshing drum and a thresh basket.

5. A harvester thresher as defined in claim 1, wherein said threshing drums of said axial threshing and separating arrangement are rotatable about axes of rotation, said thresh basket-sieve casing units being arranged relative to one another so that the distance between said axes of rotation of said threshing drums corresponds to the diameter of one of said thresh basket-sieve casing units.

6. A harvester thresher as defined in claim 1, wherein each of said product openings has a predetermined width, said thresh basket-sieve casing units being arranged so that they overlap with their ends in a product supply region by substantially a double width of each product supply opening.

* * * * *